(12) United States Patent
Ng

(10) Patent No.: US 11,339,609 B2
(45) Date of Patent: May 24, 2022

(54) IDLER END FOR A ROLLER BLIND

(71) Applicant: ZMC Metal Coating Inc., Woodbridge (CA)

(72) Inventor: Philip Ng, Thornhill (CA)

(73) Assignee: ZMC METAL COATING INC., Woodbridge (CA)

( * ) Notice: Subject to any disclaimer, the term of this patent is extended or adjusted under 35 U.S.C. 154(b) by 733 days.

(21) Appl. No.: 16/355,578

(22) Filed: Mar. 15, 2019

(65) Prior Publication Data

US 2019/0284875 A1 Sep. 19, 2019

Related U.S. Application Data

(60) Provisional application No. 62/643,939, filed on Mar. 16, 2018.

(51) Int. Cl.
*E06B 9/50* (2006.01)
*F16C 17/02* (2006.01)

(52) U.S. Cl.
CPC ............... *E06B 9/50* (2013.01); *F16C 17/02* (2013.01); *F16C 2314/00* (2013.01)

(58) Field of Classification Search
CPC .................................................. F16C 2314/00
USPC ............................................ 160/323.1, 368.1
See application file for complete search history.

(56) References Cited

U.S. PATENT DOCUMENTS

| | | | | |
|---|---|---|---|---|
| 10,745,966 B2 * | 8/2020 | Chen | ...................... | E06B 9/42 |
| 2008/0142171 A1 * | 6/2008 | Koop | ...................... | E06B 9/50 |
| | | | | 160/243 |
| 2010/0200179 A1 * | 8/2010 | Di Stefano | ............... | E06B 9/42 |
| | | | | 160/368.1 |
| 2014/0110212 A1 * | 4/2014 | Ng | ...................... | F16D 41/206 |
| | | | | 192/75 |
| 2021/0071475 A1 * | 3/2021 | Seiple | ...................... | E06B 9/50 |

FOREIGN PATENT DOCUMENTS

| | | | | | |
|---|---|---|---|---|---|
| AU | 2021107223 A4 | * | 12/2021 | | |
| CA | 3035047 A1 | * | 9/2019 | ............... | E06B 9/50 |
| GB | 2570690 A | * | 8/2019 | ............... | E06B 9/42 |
| WO | WO-2018223483 A1 | * | 12/2018 | ............... | A47H 5/02 |

* cited by examiner

*Primary Examiner* — Beth A Stephan
(74) *Attorney, Agent, or Firm* — Emerson, Thomson & Bennett, LLC; Roger D. Emerson

(57) ABSTRACT

An idler end for a roller tube of a roller blind. The idler end includes a housing having a bore therethrough, an internal partition and a generally cylindrical passageway extending through said partition. The passageway has an internal first should for engagement with a fastener. The idler end includes a shaft having (i) a pin portion for engagement with the roller blind, (ii) a receiver configured to pass through the passageway and for engagement with said fastener, and (iii) a second shoulder between the pin portion and the receiver end, and a biasing member configured to longitudinally bias said pin portion away from said housing. The idler end further includes a ring member surrounding said shaft positioned between said second shoulder and said biasing member, the ring member reducing the generation of noise created through rotational movement of said biasing member relative to said second shoulder.

9 Claims, 7 Drawing Sheets

IDLER END FOR A ROLLER BLIND

CROSS REFERENCE TO RELATED APPLICATIONS

This non-provisional application claims priority to U.S. Provisional Patent Application Ser. No. 62/643,939, filed on Mar. 16, 2018.

TECHNICAL FIELD

This invention relates generally to roller blinds, or window shades, and in particular to an idler end for such devices.

BACKGROUND

Conventionally, the roller tubes of roller blinds or window shades are rotated to retract or extend the shade in order to regulate how much of a window is covered.

Movement of the roller blind components may produce undesirable noise. It is therefore desirable to utilize roller blind components that produce a minimal amount of noise.

SUMMARY

In one aspect the invention there is provided an idler end for a roller tube of a roller blind, the idler end comprising a housing having an external surface adapted to engage the roller tube, a bore extending therethrough and having an outer bore portion, an inner bore portion, and a central bore portion connecting the outer bore portion to the inner bore portion along a common longitudinal axis, an internal partition extending perpendicular to the axis and having an exterior face adjacent to said outer bore portion, and a generally cylindrical passageway extending from an interior end of the housing to said partition, the passageway defining the central and inner bore portions and having an internal first shoulder separating the central bore portion from said inner bore portion; a fastener having a head configured to abut the first shoulder of said passageway, the fastener having a body receivable through said central bore portion in said passageway when said fastener head abuts said first shoulder; a shaft having (i) a pin portion for engagement with an end bracket of the roller blind, (ii) a receiver configured for slidable passage through said central bore portion and for engagement with said fastener body, and (iii) a second shoulder positioned between the pin portion and the receiver and extending perpendicular from said shaft; a biasing member positioned between said exterior face of said partition of said housing and said second shoulder to longitudinally bias said pin portion away from said housing, the abutment of the head of the fastener with the first shoulder when the receiver is engaged with the fastener body limiting extension of said pin portion away from said housing; and a ring member surrounding said shaft and positioned between said second shoulder and said biasing member, said ring member in contact with said biasing member on a first side and in contact with said second shoulder on a second side, said ring member reducing the generation of noise created through rotational movement of said biasing member relative to said second shoulder.

In another aspect of the invention there is provided an idler end for a roller tube of a roller blind, the idler end comprising a housing having an external surface adapted to engage the roller tube, a bore extending therethrough and having an outer bore portion, an inner bore portion, and a central bore portion connecting the outer bore portion to the inner bore portion along a common longitudinal axis, an internal partition extending perpendicular to the axis and having an exterior face adjacent to said outer bore portion, and a generally cylindrical passageway extending from an interior end of the housing to said partition, the passageway defining said central and inner bore portions and having an internal first shoulder separating the central bore portion from the inner bore portion; a fastener having a head configured to abut with the first shoulder, the fastener having a body receivable through said central bore portion in said passageway when said fastener head abuts said first shoulder; a shaft having (i) a pin portion for engagement with an end bracket of the roller blind, (ii) a receiver configured for slidable passage through said central bore portion and for engagement with said fastener body, and (iii) a second shoulder positioned between the pin portion and the receiver and extending perpendicular from said shaft; a helical spring surrounding said shaft and positioned between said exterior face of said partition of said housing and said second shoulder to longitudinally bias said pin portion outwardly away from said housing, the abutment of the head of the fastener with the first shoulder when the receiver is engaged with the fastener body limiting extension of said pin portion away from said housing; and a ring member surrounding said shaft and positioned between said second shoulder and said helical spring, said ring member in contact with said helical spring on a first side and in contact with said second shoulder on a second side, said ring member having a machined, polished, or friction reducing surface on at least said second side contacting said second shoulder to help reduce the generation of noise created through rotational movement of said helical spring relative to said second shoulder.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DETAILED DESCRIPTION

The present invention may be embodied in a number of different forms. The specification and drawings that follow describe and disclose some of the specific forms of the invention.

Figure 1:
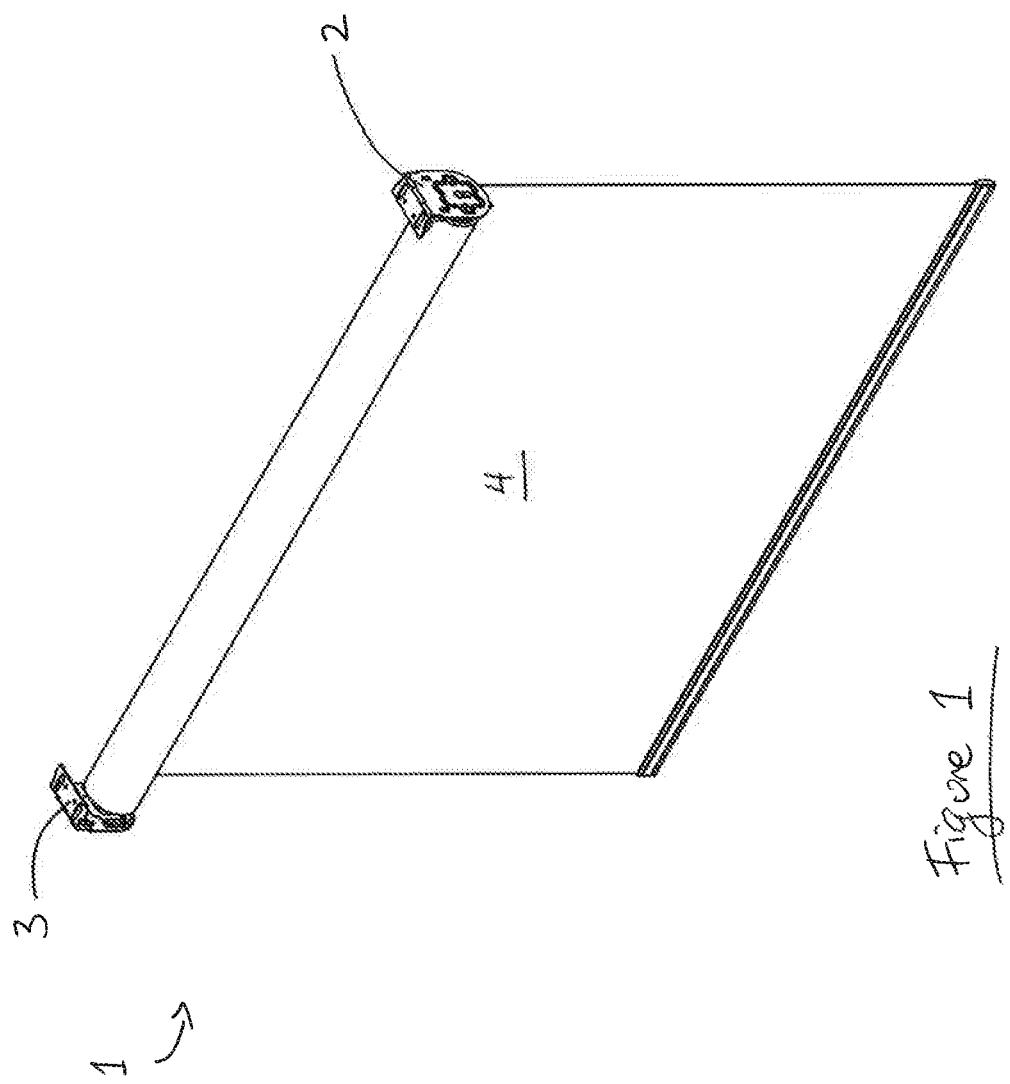
FIG. 1 is an upper front perspective view of a roller blind.
Figure 2:
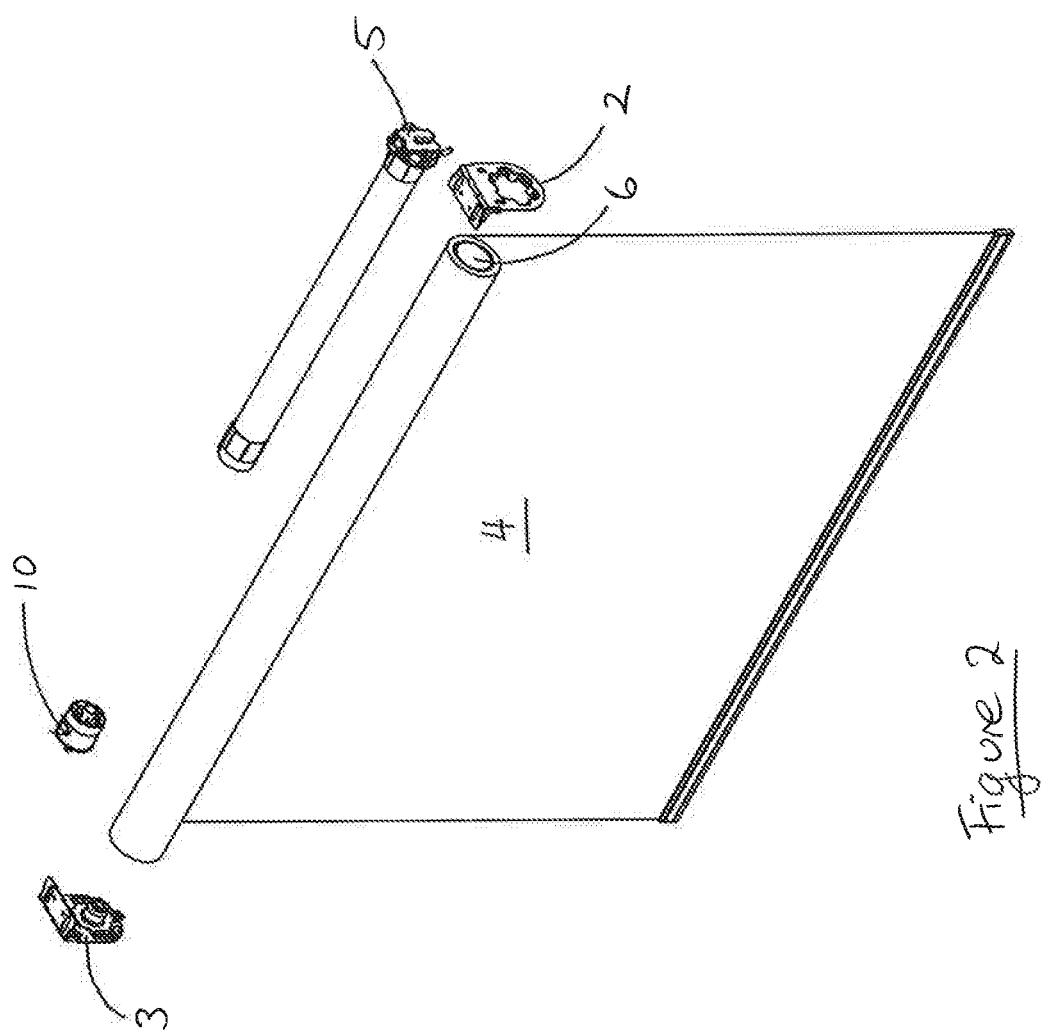
FIG. 2 is a partially exploded view of the roller bind of FIG. 1.
Figure 3:
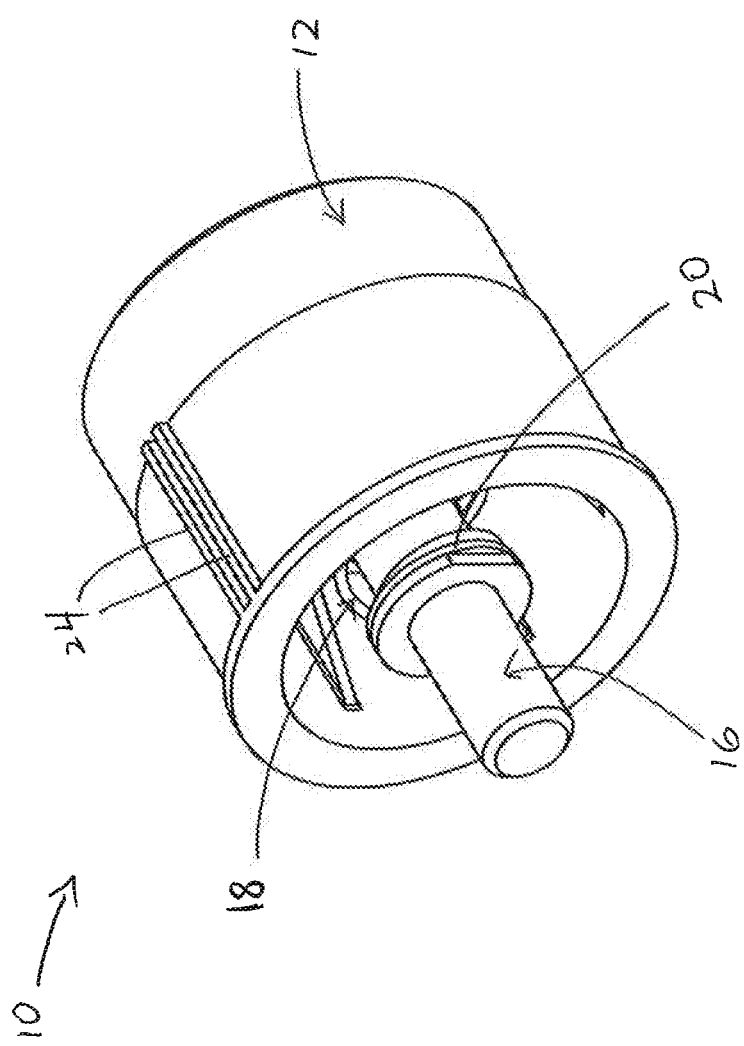
FIG. 3 is an upper end perspective view of an idler end of a roller blind according to an embedment of the present invention.

As shown in FIGS. 1 and 2, a traditional roller blind 1 typically includes a clutch end bracket 2, an idler end bracket 3, and shade portion 4. Clutch end bracket 2 engages a clutch 5, which in turn engages a roller tube 6 to rotate the roller tube and regulate the extension or retraction of shade portion 4. Idler end bracket 3 engages an idle end 10, which in turn engages roller tube 6 to support roller tube 6 while allowing the roller tube to rotate.

In FIGS. 3-9, there is shown idler end 10 according to an example embodiment of the present invention.

Figure 4:
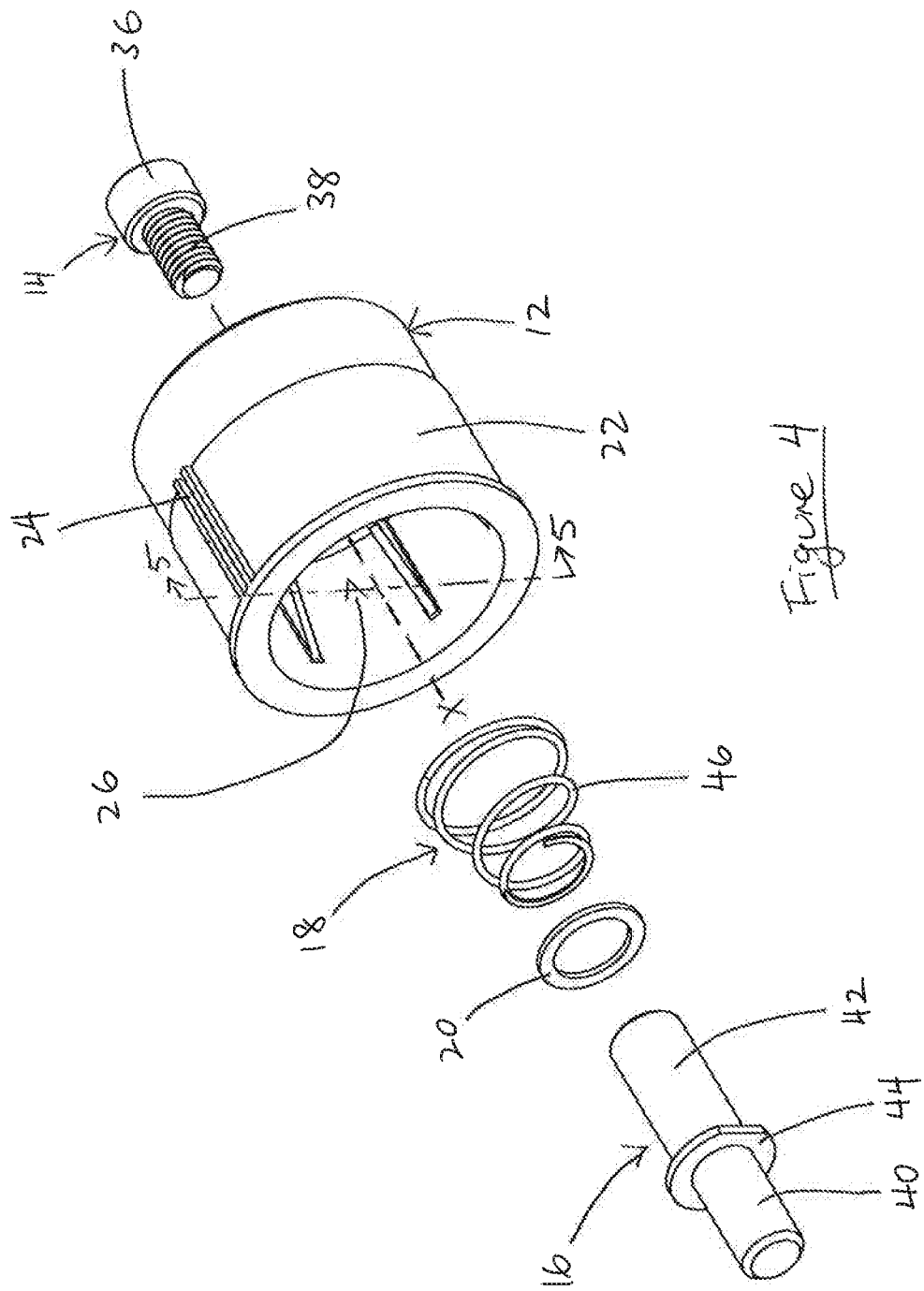
FIG. 4 is an exploded view of the idler end of FIG. 3.

As best shown in FIG. 4, idler end 10 includes a housing 12, a fastener 14, a shaft 16, a biasing member 18, and a ring member 20.

Housing 12 has an external surface 22 adapted to engage the inner diameter of roller tube 6. In the depicted embodiment, external surface 22 includes ridges 24. Ridges 24 frictionally engage correspondingly shaped ribs on the interior surface roller tube 6 to create a tight fit, such that when roller tube 6 rotates, housing 12 rotates with it.

Figure 5:
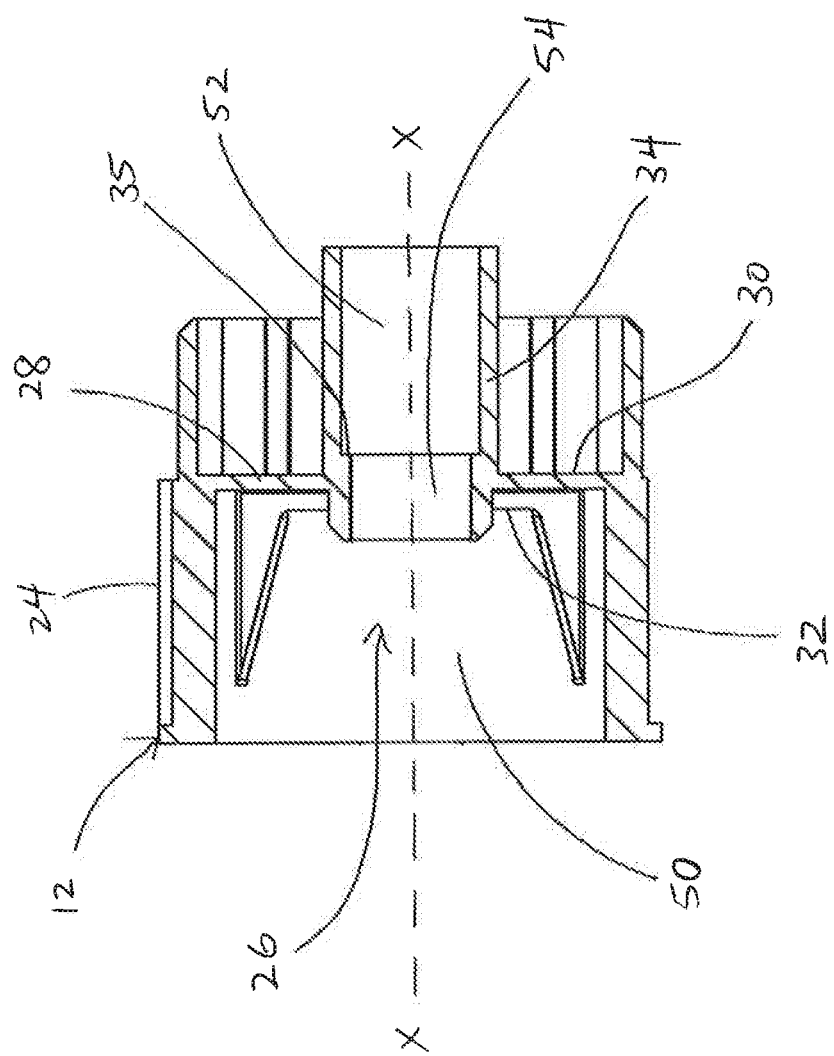
FIG. 5 is a cross sectional view of a housing of FIG. 4 along line 5-5.

Housing 12 further has a bore 26 extending therethrough and having a longitudinal axis X. As shown in FIG. 5, housing 12 has an internal partition 28, extending perpendicular to axis X, and a generally cylindrical passageway 34 passing from the interior face of housing 12 to partition 28. Partition 28 and passageway 34 collectively divide bore 26 generally into three portions: (i) an outer bore portion 50 having a first diameter, (ii) an inner bore portion 52 having a second diameter, and (iii) a central bore portion 54 having a third diameter and connecting the outer and inner bore portions. In the particular embodiment depicted, the first diameter is greater than the second diameter, which in turn is greater than the third diameter.

As shown, partition 28 has an interior face 30 and an exterior face 32, which is adjacent to outer bore portion 50. Passageway 34 defines inner bore portion 52 and is co-axial with central bore portion 54. An internal first shoulder 35 separates central bore portion 54 from inner bore portion 52.

Passageway 34 is configured to receive fastener 14 therethrough. In an embodiment, fastener 14 has a head 36, configured to abut first shoulder 35, and a body 38 for extending through central bore 54 and through partition 28. Fastener 14 will commonly comprise a threaded bolt or screw, although other forms of fasteners could also be used.

Figure 7:
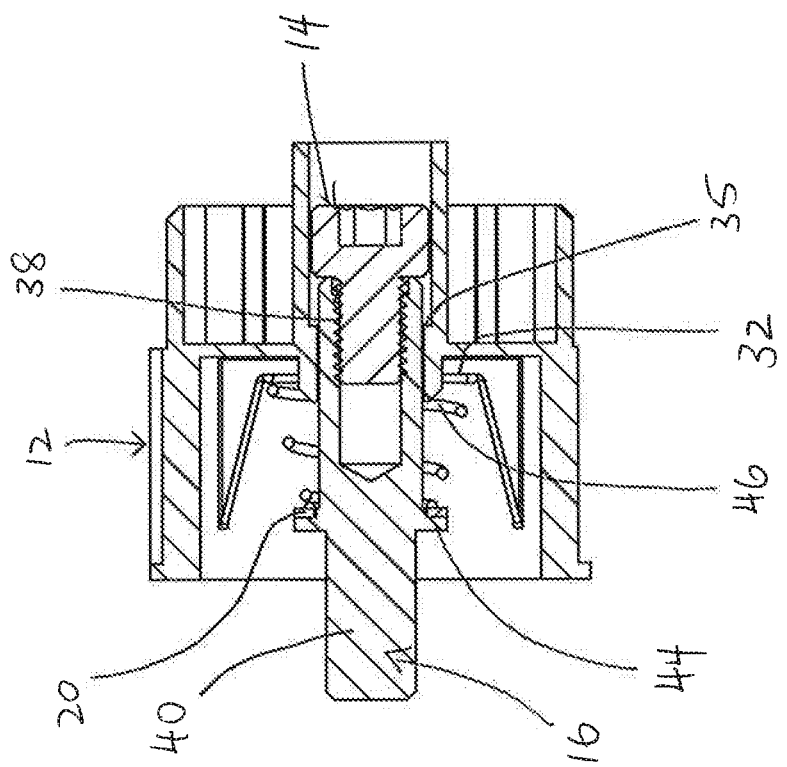
FIG. 7 is a cross sectional view along line 7-7 of FIG. 6.
Figure 6:
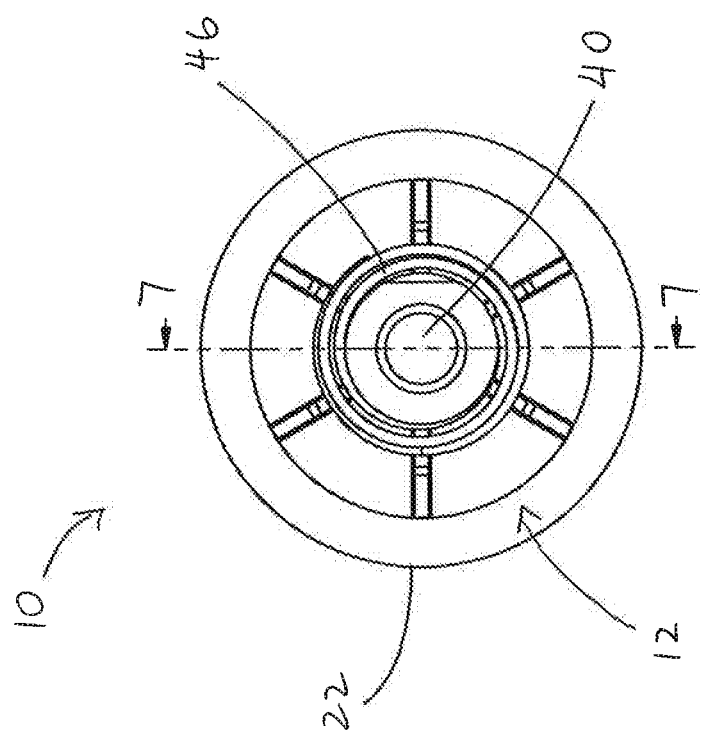
FIG. 6 is a front elevational view of the idler end of FIG. 3 in a first configuration.
Figure 9:
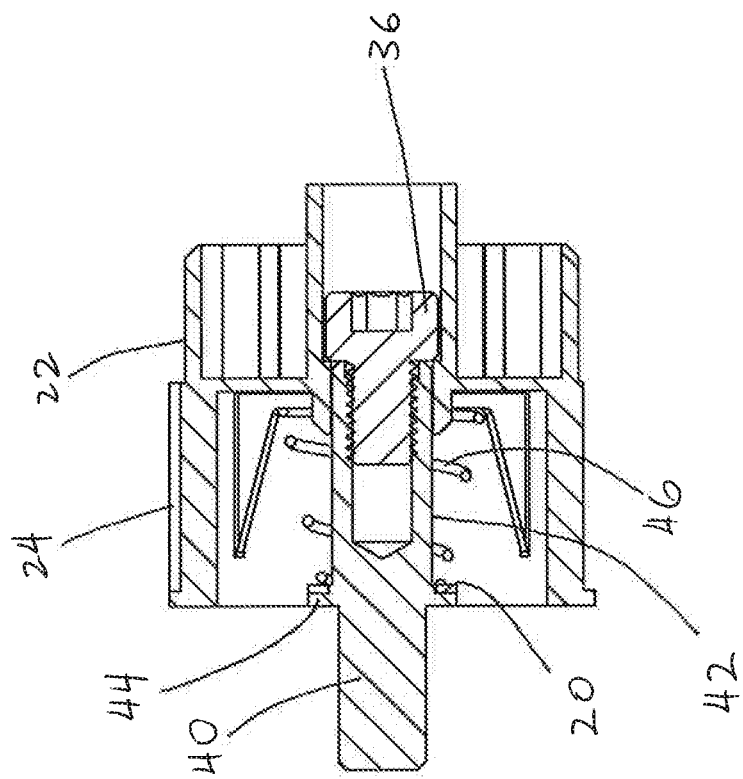
Figure 8:
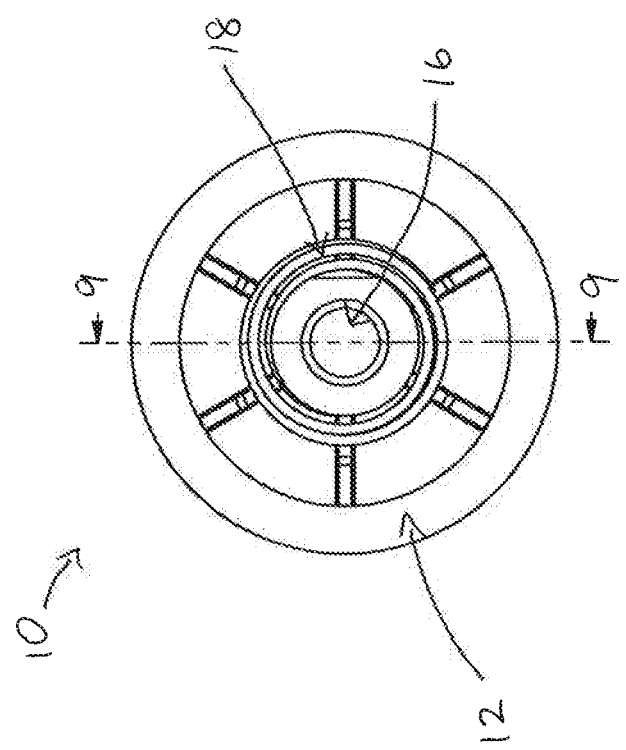
FIG. 8 is a front elevational view of the idler end of FIG. 3 in a second configuration; and, FIG. 9 is a cross sectional view along line 9-9 of FIG. 8.

Shaft 16 has a pin portion 40, for engagement with idler end bracket 3 of roller blind 1, and a receiver 42 configured to slidingly pass through central bore 54 for engagement with fastener 14 (see FIGS. 7 and 9). Shaft 16 also includes a second shoulder 44, positioned between pin portion 40 and receiver 42, and extending perpendicularly from shaft 16.

Biasing member 18 is positioned between exterior face 32 of partition 28 and second shoulder 44 so as to longitudinally bias pin portion 40 away from housing 12. In the embodiment shown, biasing member 18 is a conical, helical spring 46 which surrounds receiver 42. As understood by those skilled in the art, other types of biasing members could be also used.

Typically, when roller tube 6 is being installed, shaft 16 is longitudinally compressed into housing 12 (see FIG. 7) to allow pin portion 40 to clear idler end bracket 2. Once pin portion 40 is aligned with the corresponding aperture (not shown), in idler end bracket 2, shaft 16 is released and spring 46 longitudinally biases pin portion 40 away from housing 12 into a hole or other opening in idler end bracket 2 for engagement therewith. The abutment of head 36 of fastener 14 with first shoulder 35 limits the extension of pin portion 40 outwardly from housing 12, as best shown in FIG. 9.

Ring member 20 is positioned between second shoulder 44 and spring 46, about shaft 16. In this manner, ring member 20 will be in contact with helical spring 46 on a first side and in contact with second shoulder 44 on a second side. In other words, ring member 20 separates or prevents contact between spring 46 and second shoulder 44.

Typically, as housing 12 rotates with roller tube 6, spring 46 will also rotate. Since shaft 16 is the component which largely supports the weight of one end of roller tube 6 the friction between pin portion 40 and idler end bracket 3 is often such that pin 40 does not rotate with housing 12 and remains stationary when roller tube 6 rotates. In that instance, spring 46 maintains contact and rubs against second shoulder 44 as it rotates. The rubbing between spring 46 and second shoulder 44 contributes to the noise that may result when clutch 5 of roller blind 1 is activated.

The presence of ring member 20 helps to reduce such noise by separating or preventing contact between spring 46 and second shoulder 44, and by generally rotating with spring 46 when roller tube 6 rotates.

In some applications, ring member 20 may have a fiction-reducing coating on at least the side contacting second shoulder 44, in order to help reduce noise created between ring member 20 and second shoulder 44. In other applications, ring member 20 may have a machined or polished surface on the side contacting shoulder 44. Alternatively, or additionally, second shoulder 44 may have a machined or polished surface on the side contacting ring member 20, and/or shoulder 44 may have a machined or polished exterior surface. As a further alternative, ring member 20, second shoulder 44 and/or receiver 42 may be made from generally low friction materials.

In yet other applications, ring member 20 may be fixed to the outer end of spring 46 through a weld, an adhesive or mechanical fastening mechanism. Alternatively, ring member 20 and spring 46 may be of unitary construction, where ring member 20 forms the outer end of spring 46 such that the outer end of spring 46 contacts second shoulder 44 during use of idler end 10.

As will be understood by the skilled person, other manners by which frictional contact or rubbing between rotating biasing member 18 and second shoulder 44 may be reduced are possible.

It is to be understood that what has been described are the preferred embodiments of the invention. The scope of the claims should not be limited by the preferred embodiments set forth above, but should be given the broadest interpretation consistent with the description as a whole.

What is claimed is:

1. An idler end for a roller tube of a roller blind, the idler end comprising:
 a housing having:
  an external surface adapted to engage the roller tube;
  a bore extending therethrough and having an outer bore portion, an inner bore portion, and a central bore portion connecting the outer bore portion to the inner bore portion along a common longitudinal axis;
  an internal partition extending perpendicular to the axis and having an exterior face adjacent to said outer bore portion; and,
  a generally cylindrical passageway extending from an interior end of the housing to said partition, the passageway defining the central and inner bore portions and having an internal first shoulder separating the central bore portion from said inner bore portion;
 a fastener having a head configured to abut the first shoulder of said passageway, the fastener having a body receivable through said central bore portion in said passageway when said fastener head abuts said first shoulder;
 a shaft having:

(i) a pin portion for engagement with an end bracket of the roller blind;
(ii) a receiver configured for slidable passage through said central bore portion and for engagement with said fastener body; and,
(iii) a second shoulder positioned between the pin portion and the receiver and extending perpendicular from said shaft;

a biasing member positioned between said exterior face of said partition of said housing and said second shoulder to longitudinally bias said pin portion away from said housing, the abutment of the head of the fastener with the first shoulder when the receiver is engaged with the fastener body limiting extension of said pin portion away from said housing; and, a ring member surrounding said shaft and positioned between said second shoulder and said biasing member, said ring member in contact with said biasing member on a first side and in contact with said second shoulder on a second side, said ring member reducing the generation of noise created through rotational movement of said biasing member relative to said second shoulder.

2. The idler end of claim 1, wherein said ring member has a fiction-reducing coating on at least said second side.

3. The idler end of claim 1, wherein said ring member has a machined or polished surface on at least said second side.

4. The idler end of claim 1, wherein said second shoulder has a machined or polished surface on at least a side contacting said ring member.

5. The idler end of claim 1, wherein said receiver of said shaft has a machined or polished exterior surface.

6. The idler end of claim 1, wherein said biasing member is a helical spring surrounding said shaft.

7. The idler end of claim 6, wherein said ring member is fixed to said spring through a weld, adhesive or mechanical fastener.

8. The idler end of claim 6, wherein said ring member and said spring are of unitary construction, said ring member forming an outer end of said spring and contacting said second shoulder during use of said idler end.

9. An idler end for a roller tube of a roller blind, the idler end comprising:
a housing having:
an external surface adapted to engage the roller tube;
a bore extending therethrough and having an outer bore portion, an inner bore portion, and a central bore portion connecting the outer bore portion to the inner bore portion along a common longitudinal axis;
an internal partition extending perpendicular to the axis and having an exterior face adjacent to said outer bore portion; and,
a generally cylindrical passageway extending from an interior end of the housing to said partition, the passageway defining said central and inner bore portions and having an internal first shoulder separating the central bore portion from the inner bore portion;

a fastener having a head configured to abut with the first shoulder, the fastener having a body receivable through said central bore portion in said passageway when said fastener head abuts said first shoulder;

a shaft having:
(i) a pin portion for engagement with an end bracket of the roller blind;
(ii) a receiver configured for slidable passage through said central bore portion and for engagement with said fastener body; and,
(iii) a second shoulder positioned between the pin portion and the receiver and extending perpendicular from said shaft;

a helical spring surrounding said shaft and positioned between said exterior face of said partition of said housing and said second shoulder to longitudinally bias said pin portion outwardly away from said housing, the abutment of the head of the fastener with the first shoulder when the receiver is engaged with the fastener body limiting extension of said pin portion away from said housing; and a ring member surrounding said shaft and positioned between said second shoulder and said helical spring, said ring member in contact with said helical spring on a first side and in contact with said second shoulder on a second side, said ring member having a machined, polished, or friction reducing surface on at least said second side contacting said second shoulder to help reduce the generation of noise created through rotational movement of said helical spring relative to said second shoulder.

* * * * *